United States Patent
Cote, Jr.

[11] 3,884,498
[45] May 20, 1975

[54] SNOWMOBILE TRAIL SWEEP

[76] Inventor: Louis P. Cote, Jr., 13 Horizon Dr., Bedford, N.H. 03102

[22] Filed: May 7, 1973

[21] Appl. No.: 357,782

[52] U.S. Cl. ............... 280/150 R; 37/50; 180/5; 272/189
[51] Int. Cl. ................................ B62m 27/02
[58] Field of Search .......... 37/50, 53; 272/189, 190, 272/197, 199, 200; 280/150 R; 188/8; 180/5; 172/781, 174, 180

[56] References Cited
UNITED STATES PATENTS

| | | |
|---|---|---|
| 1,108,126 | 8/1914 | Boyd .................................. 172/190 |
| 2,700,427 | 1/1955 | Schomers .......................... 188/8 X |
| 3,632,124 | 1/1972 | Cropp ................................. 188/8 |
| 3,658,358 | 4/1972 | Baker ............................ 280/150 R |
| 3,666,020 | 5/1972 | Hess .................................. 172/189 |

*Primary Examiner*—Robert B. Reeves
*Assistant Examiner*—Thomas E. Kocovsky
*Attorney, Agent, or Firm*—Thomas N. Tarrant, Esq.

[57] ABSTRACT

A flexible, precurved drag flap for attachment to the rear of snow vehicles so as to smooth the snow behind the vehicles. The drag is made of an elastic material, precurved to maintain the drag edge no lower than the tracks of the vehicle and sufficiently flexible to permit its being flexed upwardly and fastened in an inoperative position.

3 Claims, 4 Drawing Figures

PATENTED MAY 20 1975  3,884,498

SNOWMOBILE TRAIL SWEEP

BACKGROUND OF THE INVENTION:

1. Field of the Invention

The invention relates to devices for smoothing the snow surface and particularly to such a device supported from the back of a snow vehicle.

2. Description of the Prior Art

It has been common for some time on ski slopes to tow various types of drags behind snow tractors to pack, redistribute and smooth the snow surface to improve the condition of ski slopes. Today an enormous number of snowmobiles have come into use and are used extensively in restricted areas set aside for such use. In such areas, snowmobile clubs frequently operate in large groups following one behind the other or so close that their trails interact. Snowmobile treads cause severe disturbances in the snow along the trails so that for each successive vehicle, passage becomes a little more difficult and the ride a little more uncomfortable. Some of the snowmobile clubs have invested in drags to clear up the trails before and/or after their use, frequently utilizing special heavy duty snow vehicles for operating such drags. This problem of maintaining the snowmobile trailways has proven to be a severe inconvenience in the enjoyment of the sport.

SUMMARY OF THE INVENTION

Now, in accordance with the present invention, a trail sweep is provided for attachment to the rear of each snowmobile which has small effect on the operation of the snowmobile and continuously tailors the snow on the following trail. Thus, not only are the snowmobile trails thereby kept continuously in good condition, but the necessity of repairing the trails with tedious operation of separate and more cumbersome equipment is made unnecessary. To this end the snow sweep is made in a resilient precurved material for supporting a snow tailoring blade at a level close to the plane of the snowmobile treads. The flexible nature of the sweep not only permits it to flex away from rigid obstructions, but also permits the sweep to be rolled in an upward direction and be secured by a hook or other attachment for holding it out of the way when operating on terrain that does not require the sweep operation.

Thus, it is an object of the invention to provide a novel snow sweep for attachment to snow vehicles.

DESCRIPTION OF THE PREFERRED EMBODIMENT

Figure 1:
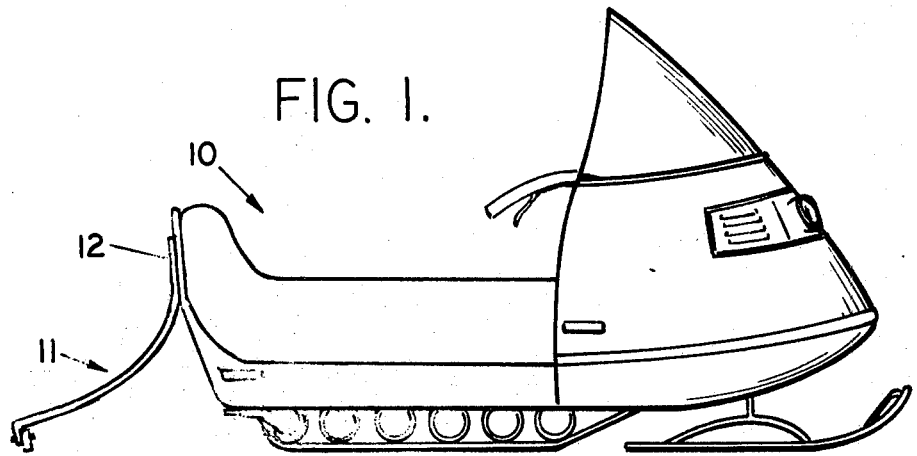
FIG. 1 is a side elevation of a snowmobile with the inventive snow sweep attached.

A snowmobile designated as 10 in FIG. 1 leaves disturbed tracks in the snow which can be leveled by a sweep 11 secured to the rear of a snowmobile by a mounting portion 12. A replaceable blade 14 secured at the bottom edge of sweep 11 provides a straight hard smoothing edge and is readily replaceable when excessively worn by dragging over rocky areas and ice. Blade 14 is depicted in FIG. 1 as being on a level with the bottom surface of the snowmobile treads. The exact preferred position is dependent upon the flexibility of the sweep since in operation it is desirable to have the trail left behind the snowmobile filled in at a level higher than the tread level. Thus, a relatively stiff snow sweep will be positioned an inch or more above the level of the tread while a more flexible one may desirably be positioned as illustrated since during operation it will flex backward and upward to affect a level above the plane of the treads.

Figure 2:
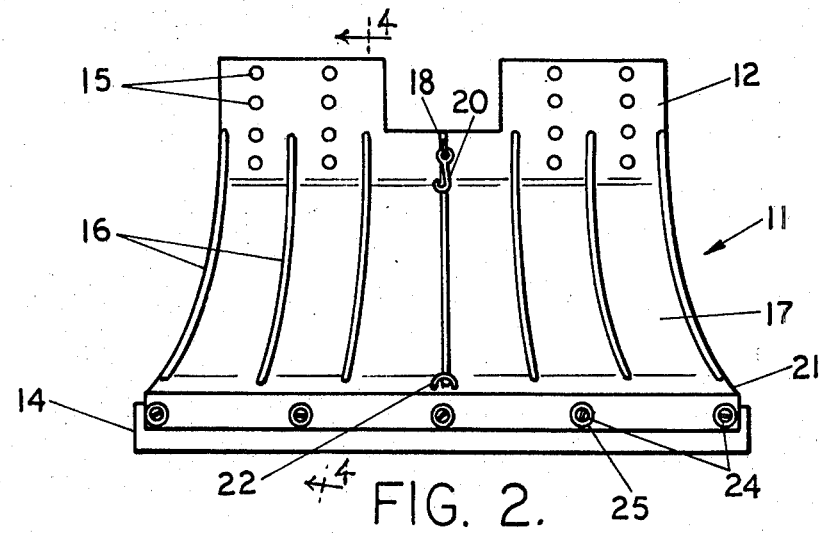
FIG. 2 is a front elevation of the inventive snow sweep.

Since the disturbance left by snowmobile treads is frequently somewhat wider than the mounting surface available on the rear of the snowmobile, snow sweep 11 as depicted in FIG. 2 is wider at scraping blade 14 than at its mounting portion 12. Mounting portion 12 is cut out at the center to provide clearance for a towing attachment commonly found on snowmobiles. A plurality of apertures 15 in mounting portion 12 provide mounting flexibility for attaching bolts on various models of snowmobiles.

Figure 3:
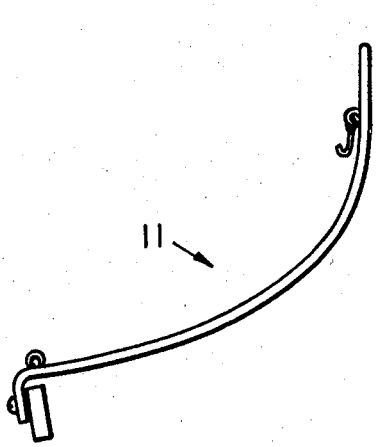
FIG. 3 is a side elevation of the inventive snow sweep.

The body of snow sweep 11 is somewhat similar to mud flaps frequently mounted behind car wheels. As depicted, it is formed from a rubber or rubberlike material 17 containing flexible supporting bars 16 molded inside material 17. Supporting bars 16 may be made of a spring steel or similar material preformed to the curvature depicted in FIGS. 3 and 4. The rubber or rubberlike material 17 is molded about supporting bars 16 in the same curved shape. The strength of the curved assembly must be such that when sweep 11 is held by mounting portion 12, the weight of scraper blade 14 will have little effect upon straightening out the curvature of the sweep.

Figure 4:
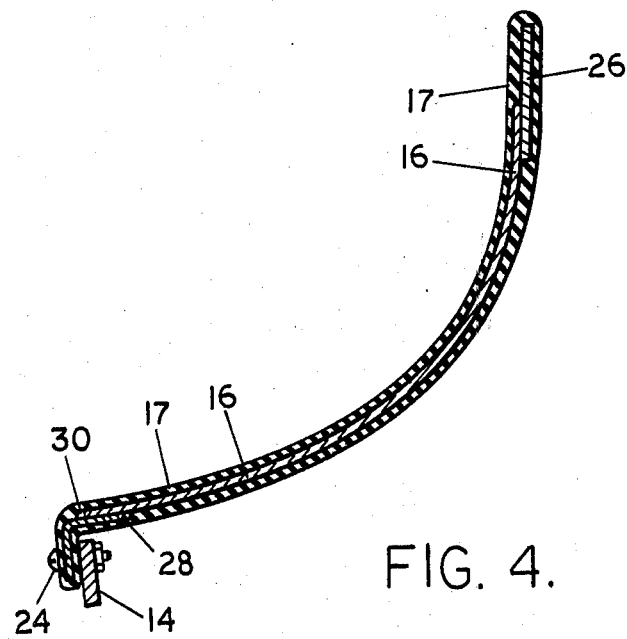
FIG. 4 is a section through 4—4 of FIG. 2.

Referring to FIG. 4, it will be seen that supporting bar 16 is completely molded within rubber material 17. In addition, an internal metal plate 26 reinforces mounting portion 12 and provides a surface to which each of supporting bars 16 may be secured as by welding. The lower terminating end of sweep 11 where blade 14 is attached is similarly reinforced by angle iron 18 to which the lower ends of supporting bars 16 may be secured as by welding at 30. Mounting screws 24 pass through apertures in the rubber body material 17 and angle iron 28 for securing blade 14. The body material 17 is desirably protected from screws 24 by metal reinforcing rings 25 clamped into the apertures. Additionally, a ring 18 supporting a hook 20 is secured as by welding at the center of mounting plate 26 and a further ring 22 is secured as by welding to the center of angle iron 28. This permits the blade portion to be bent upwardly and ring 22 engaged by hook 20 to hold the sweep supported in a raised inoperative position. In use, sweep 11 is secured to the rear of the snow vehicle at a position determined by selection of mounting apertures 15 so as to position blade 14 at the desired level.

In an exemplary model, the sweep is 15 inches wide at mounting portion 12 and 20.5 inches wide at blade 14. The length along the prebent curve is 18 inches. The supporting bars and plates are all ⅛ inch steel. The curvature is such that the vertical height from the bottom of blade 14 to the top of portion 12 is 13 inches and the horizontal distance from portion 12 to blade 14 is 12 inches. A suitable mounting position holds the bottom of blade 14 one-fourth inch above the ground when the vehicle is unloaded.

While the invention has been described with relation to the specific embodiment, it will be understood that many variations are contemplated including the use of different shapes and different materials. For example, while a rubber or rubber-like material has been described with metal reinforcement, there are both metal and plastic materials available that will operate satisfactorily without reinforcement, and it is intended to cover the invention within the scope of the appended claims.

I claim:

1. A flexible snow sweep for attachment to the rear of snow vehicles consisting of a single flap comprising:
   a. a rising portion including means for securing said sweep to the rear of a snow vehicle;
   b. a portion curving downwardly and rearwardly;
   c. a terminating portion including means for securing a sweep blade;
   d. a replaceable sweep blade secured to said terminating portion; and,
   e. fastening means for fastening said terminating portion to said rising portion so as to roll up said sweep blade into an inoperative position.

2. A flexible snow sweep for attachment to the rear of snow vehicles consisting of a single flap comprising:
   a. a metal reinforcing skeleton;
   b. a rising portion including a mounting plate that is part of said skeleton for securing said sweep to the rear of a snow vehicle;
   c. a portion curving downwardly and rearwardly including a plurality of curved supporting bars that are part of said skeleton connected to said mounting plate;
   d. a terminating portion including an angle iron that is part of said skeleton and connected to said bars for securing a sweep blade; and
   e. a replaceable sweep blade secured to said terminating portion.

3. A flexible snow sweep according to claim 2 wherein said skeleton is completely molded into a rubber body.

* * * * *